United States Patent
Ho et al.

(10) Patent No.: US 11,616,530 B2
(45) Date of Patent: Mar. 28, 2023

(54) ECHO CANCELLER SYSTEM AND ECHO CANCELLING METHOD

(71) Applicant: Realtek Semiconductor Corporation, Hsinchu (TW)

(72) Inventors: Hsuan-Ting Ho, Hsinchu (TW); Liang-Wei Huang, Hsinchu (TW); Kuei-Ying Lu, Hsinchu (TW); Chia-Lin Chang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 15 days.

(21) Appl. No.: 17/370,049

(22) Filed: Jul. 8, 2021

(65) Prior Publication Data

US 2022/0255583 A1   Aug. 11, 2022

(30) Foreign Application Priority Data

Feb. 9, 2021   (TW) .................................. 110104962

(51) Int. Cl.
*H04B 3/23* (2006.01)
*H04B 1/04* (2006.01)

(52) U.S. Cl.
CPC .............. *H04B 3/231* (2013.01); *H04B 1/04* (2013.01)

(58) Field of Classification Search
CPC .................................. H04B 1/04; H04B 3/231
See application file for complete search history.

(56) References Cited

U.S. PATENT DOCUMENTS

| | | | |
|---|---|---|---|
| 6,826,279 B1 * | 11/2004 | Alavi ..................... | H04M 9/082 379/406.01 |
| 2003/0076950 A1 * | 4/2003 | Usman ..................... | H04B 3/23 379/406.08 |
| 2003/0112887 A1 * | 6/2003 | Sang ....................... | H04B 3/23 375/232 |

FOREIGN PATENT DOCUMENTS

| | | |
|---|---|---|
| CN | 100488072 C | 5/2009 |
| CN | 102387273 B | 8/2013 |
| CN | 103179296 B | 2/2017 |

* cited by examiner

*Primary Examiner* — David S Huang
(74) *Attorney, Agent, or Firm* — Locke Lord LLP; Tim Tingkang Xia, Esq.

(57) ABSTRACT

An echo canceller system includes a data transmitter circuit and an echo canceller circuit. The data transmitter circuit is configured to receive a transmitted signal. The echo canceller circuit includes a first filter. The first filter is configured to generate a first filtered signal according to the transmitted signal and a filter coefficient vector. The filter coefficient vector is updated according to a high-frequency leakage process. The echo canceller circuit is further configured to generate an echo cancelling signal according to the first filtered signal. The data transmitter circuit is further configured to generate an output signal according to a received signal and the echo cancelling signal.

16 Claims, 4 Drawing Sheets

US 11,616,530 B2

ECHO CANCELLER SYSTEM AND ECHO CANCELLING METHOD

RELATED APPLICATIONS

This application claims priority to Taiwanese Application Serial Number 110104962, filed Feb. 9, 2021, which is herein incorporated by reference.

BACKGROUND

Technical Field

The present disclosure relates to echo cancelling technology, more particularly, an echo canceller system and an echo cancelling method.

Description of Related Art

With development of communication technology, various communication systems are developed and used in different applications. In a full-duplex system, signals with different directions (inward and outward respect to the system) are transmitted via a pair of transmission lines respectively. When the impedances of the pair of transmission lines are unmatched or the hybrid architecture of the receiver is improper, the transmitted signal (outward direction) may be introduced into the received signal (inward direction). Such echoes can affect the signal-to-noise ratio (SNR) of the communication system.

SUMMARY

Some aspects of the present disclosure are to provide an echo canceller system. The echo canceller system includes a data transmitter circuit and an echo canceller circuit. The data transmitter circuit is configured to receive a transmitted signal. The echo canceller circuit includes a first filter. The first filter is configured to generate a first filtered signal according to the transmitted signal and a filter coefficient vector. The filter coefficient vector is updated according to a high-frequency leakage process. The echo canceller circuit is further configured to generate an echo cancelling signal according to the first filtered signal. The data transmitter circuit is further configured to generate an output signal according to a received signal and the echo cancelling signal.

Some aspects of the present disclosure are to provide an echo cancelling method. The echo cancelling method includes the following operations: receiving, by a data transmitter circuit, a transmitted signal; generating, by a first filter of an echo canceller circuit, a first filtered signal according to the transmitted signal and a filter coefficient vector, in which the filter coefficient vector is updated according to a high-frequency leakage process; generating, by the echo canceller circuit, an echo cancelling signal according to the first filtered signal; and generating, by the data transmitter circuit, an output signal according to a received signal and the echo cancelling signal.

As described above, in the present disclosure, the filter coefficients of the filter circuit can be updated according to the high-frequency leakage process. Accordingly, the high-frequency components can be suppressed to avoid signal drifting such that the echo cancelling system can operate correctly.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
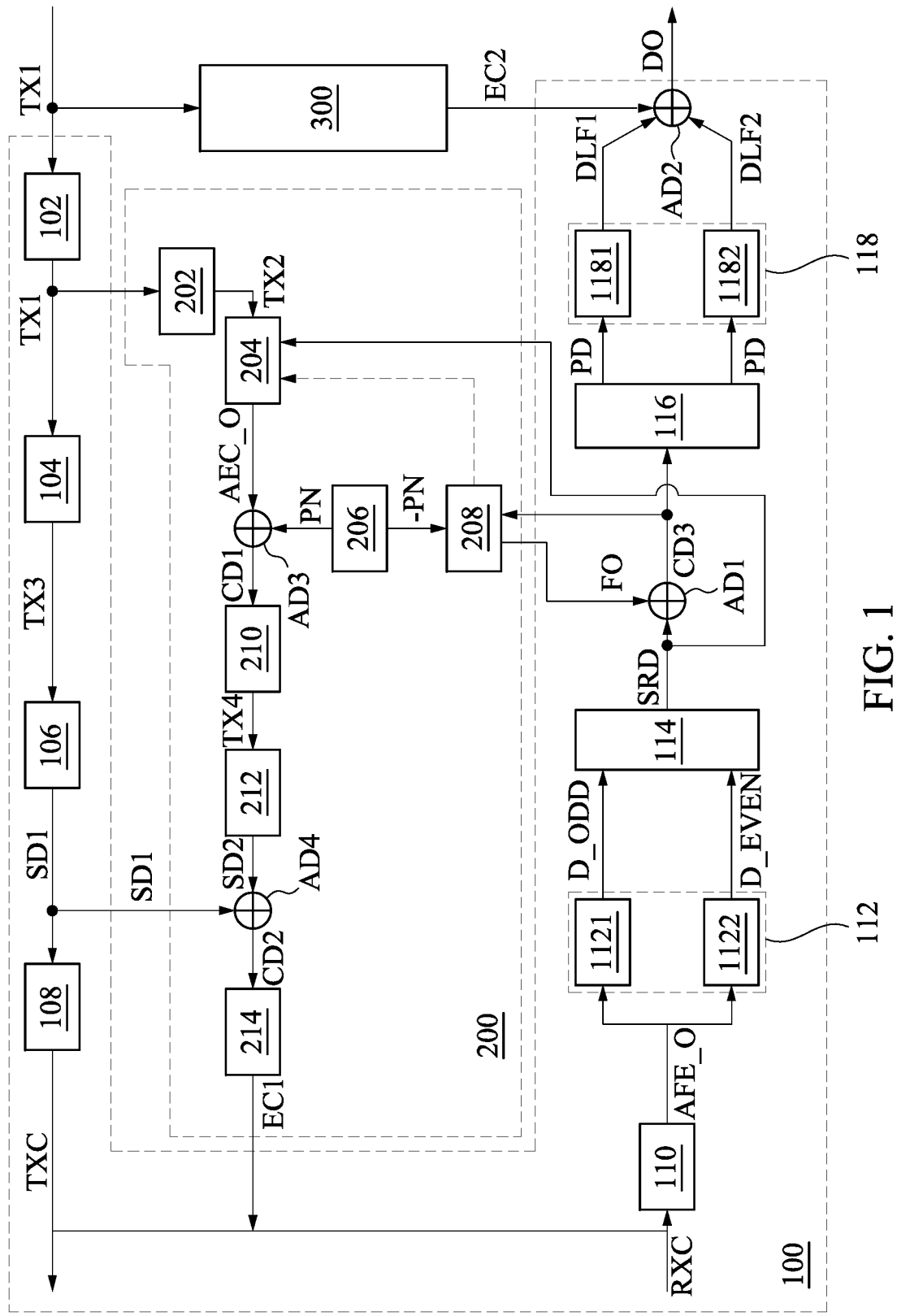
FIG. 1 is a schematic diagram illustrating an echo canceller system according to some embodiments of the present disclosure.

Reference is made to FIG. 1. FIG. 1 is a schematic diagram illustrating an echo canceller system S1 according to some embodiments of the present disclosure. In some embodiments, the echo canceller system S1 is applied in an Ethernet system.

In some embodiments, the echo cancelling system S1 adopts Full-Duplex technology. In other words, a pair of transmissions lines is used in the system. One of the transmissions lines carries transmitted signals and another carries received signals. As shown in FIG. 1, a transmitted signal TX1 illustrates the transmitted signal of the echo cancelling system S1. A received signal RXC illustrates the received signal of the echo cancelling system S1. In some embodiments, the transmitted signal TX1 is generated by encoding a signal from the Media Access Control (MAC) layer, but the present disclosure is not limited thereto.

As illustrated in FIG. 1, the echo cancelling system S1 includes a data transmitter circuit 100, an echo canceller circuit 200, and an echo canceller circuit 300. In some embodiments, the echo canceller circuit 200 is configured to generate an echo cancelling signal EC1 in order to cancel most of the echoes at the analog side of the system. The echo canceller circuit 300 is configured to generate an echo cancelling signal EC2 in order to cancel the residual echoes at the digital side of the system.

To be more specific, the data transmitter circuit 100 can receive the transmitted signal TX1. The transmitted signal TX1 has a first sampling rate (e.g., 400 MHz). The echo canceller circuit 200 receives the transmitted signal TX1 and performs an oversampling process on the transmitted signal TX1 to generate a transmitted signal TX2. The transmitted signal TX2 has a second sampling rate (e.g., 800 MHz) higher than the first sampling rate. The echo canceller circuit 200 generates the echo cancelling signal EC1 according to the transmitted signal TX2. Then, the data transmitter circuit 100 generates an output signal DO according to an analog signal TXC, the received signal RXC, and the echo cancelling signals EC1 and EC2. With the echo cancelling signals EC1 and EC2, echoes can be cancelled and the signal-to-noise ratio (SNR) of the echo cancelling system S1 can be increased.

In some embodiments, the data transmitter circuit 100 includes a memory 102, an oversampling circuit 104, a shaping circuit 106, a digital-to-analog converter (DAC)

108, an analog front-end processor circuit 110, an analog-to-digital converter (ADC) circuit 112, a parallel-to-serial converter circuit 114, an adder AD1, and a serial-to-parallel converter circuit 116, a filter circuit 118, and an adder AD2. The analog-to-digital converter circuit 112 includes an analog-to-digital converter 1121 and an analog-to-digital converter 1122. The filter circuit 118 includes a filter 1181 and a filter 1182.

In some embodiments, the echo canceller circuit 200 includes an oversampling circuit 202, a filter circuit 204, an adder AD3, a random sequence generator circuit 206, a filter circuit 208, an oversampling circuit 210, a shaping circuit 212, an adder AD4, and a digital-to-analog converter 214.

The memory 102 receives the transmitted signal TX1. In some embodiments, the memory 102 is implemented by a register which can perform a first-in-first-out (FIFO) process, but the present disclosure is not limited thereto. Then, the memory 102 transmits the transmitted signal TX1 to the oversampling circuit 104 and the oversampling circuit 202.

The oversampling circuit 104 performs an oversampling process on the transmitted signal TX1 to generate a transmitted signal TX3. The transmitted signal TX3 has a third sampling rate (e.g., 1.6 GHz) higher than the second sampling rate. The shaping circuit 106 generates a shaping signal SD1 according to the transmitted signal TX3. The digital-to-analog converter 108 converts the shaping signal SD1 with the digital form into the analog signal TXC with the analog form. The analog signal TXC can be processed by a power converter and then outputted to a network cable or other electrical devices.

In addition, the oversampling circuit 202 performs an oversampling process on the transmitted signal TX1 to generate the transmitted signal TX2. As described above, the transmitted signal TX2 has the second sampling rate. Then, the filter circuit 204 can utilize the filtered least mean squared (FxLMS) mechanism to perform a filtering process on the transmitted signal TX2 to generate a filtered signal AEC_O. The random sequence generator circuit 206 can generate a random sequence PN. In some embodiments, the random sequence PN is a pseudo-noise sequence, but the present disclosure is not limited thereto. The adder AD3 combines the filtered signal AEC_O and the random sequence PN to generate a calculation signal CD1. The oversampling circuit 210 performs an oversampling process on the calculation signal CD1 to generate a transmitted signal TX4. The transmitted signal TX4 also has the third sampling rate. In other words, the transmitted signal TX4 and the transmitted signal TX3 have the same sampling rate. The shaping circuit 212 generates a shaping signal SD2 according to the transmitted signal TX4. The adder AD4 combines the shaping signal SD2 and the shaping signal SD1 to generate a calculation signal CD2. The digital-to-analog converter 214 converts the calculation signal CD2 with the digital form into the echo cancelling signal EC1 with the analog form.

In some embodiments, when the analog signal TXC is introduced into the transmission line that carries the received signal, echoes are generated. In other words, the analog front-end processor circuit 110 receives the introduced analog signal TXC. The analog front-end processor circuit 110 generates a processing signal AFE_O according to the analog signal TXC, the echo cancelling signal EC1 from the echo canceller circuit 200, and the received signal RXC. The processing signal AFE_O also has the third sampling rate. The analog-to-digital converter circuit 112 generates a digital signal D_ODD and a digital signal D_EVEN according to the processing signal AFE_O. In some embodiments, the digital signal D_ODD can be generated by the analog-to-digital converter 1121 that operates at the first sampling rate to sample the processing signal AFE_O with a first phase (e.g., an odd phase). The digital signal D_EVEN can be generated by the analog-to-digital converter 1122 that operates at the first sampling rate to sample the processing signal AFE_O with a second phase (e.g., an even phase). Then, the parallel-to-serial converter circuit 114 converts the digital signal D_ODD and the digital signal D_EVEN with the parallel form into a series signal SRD with the series form.

In addition, an inversion process can be applied to the random sequence PN to generate an inverted random sequence-PN. The filter circuit 208 generates a filtered signal FO according to the inverted random sequence-PN. The adder AD1 combines the filtered signal FO and the series signal SRD with the series form in order to generate a calculation signal CD3 with the series form. The serial-to-parallel converter circuit 116 converts the calculation signal CD3 with the series form into a parallel signal PD with the parallel form. The filter 1181 operates at the first sampling rate and samples the parallel signal PD with the first phase (e.g., the odd phase) to generate a filtered signal DLF1. The filter 1182 operates at the first sampling rate and samples the parallel signal PD with the second phase (e.g., the even phase) to generate a filtered signal DLF2. In some embodiments, the filter 1181 and the filter 1182 can be implemented by low-pass filters, but the present disclosure is not limited thereto. The adder AD2 combines the filtered signal DLF1, the filtered signal DLF2, and the echo cancelling signal EC2 from the echo canceller circuit 300 to generate the output signal DO.

In some related arts, the echo cancelling circuit generates the echo cancelling signal according to a signal corresponding to a lower sampling rate. In these related arts, the echo cancelling signal cannot effectively cancel echoes to increase the SNR of the system.

In the present disclosure, the echo canceller circuit 200 generates the echo cancelling signal EC1 according to the transmitted signal TX2 having a higher sampling rate (the second sampling rate, e.g., 800 MHz). Thus, the echo cancelling signal EC1 can be utilized to effectively cancel echoes such that the SNR of the echo cancelling system S1 can be effectively increased.

In addition, the sampling rate of the transmitted signal TX2 can be determined according to the sampling rate of the processing signal AFE_O outputted from the analog front-end processor circuit 110. In some embodiments, when the processing signal AFE_O has the third sampling rate, the second sampling rate of the transmitted signal TX2 outputted from the oversampling circuit 202 can be set to a half of the third sampling rate or a value lower than the third sampling rate. Thus, it can cancel most of the echoes and avoid high system costs. In some other embodiments, the second sampling rate can be identical to the third sampling rate to cancel more echoes.

Figure 2:
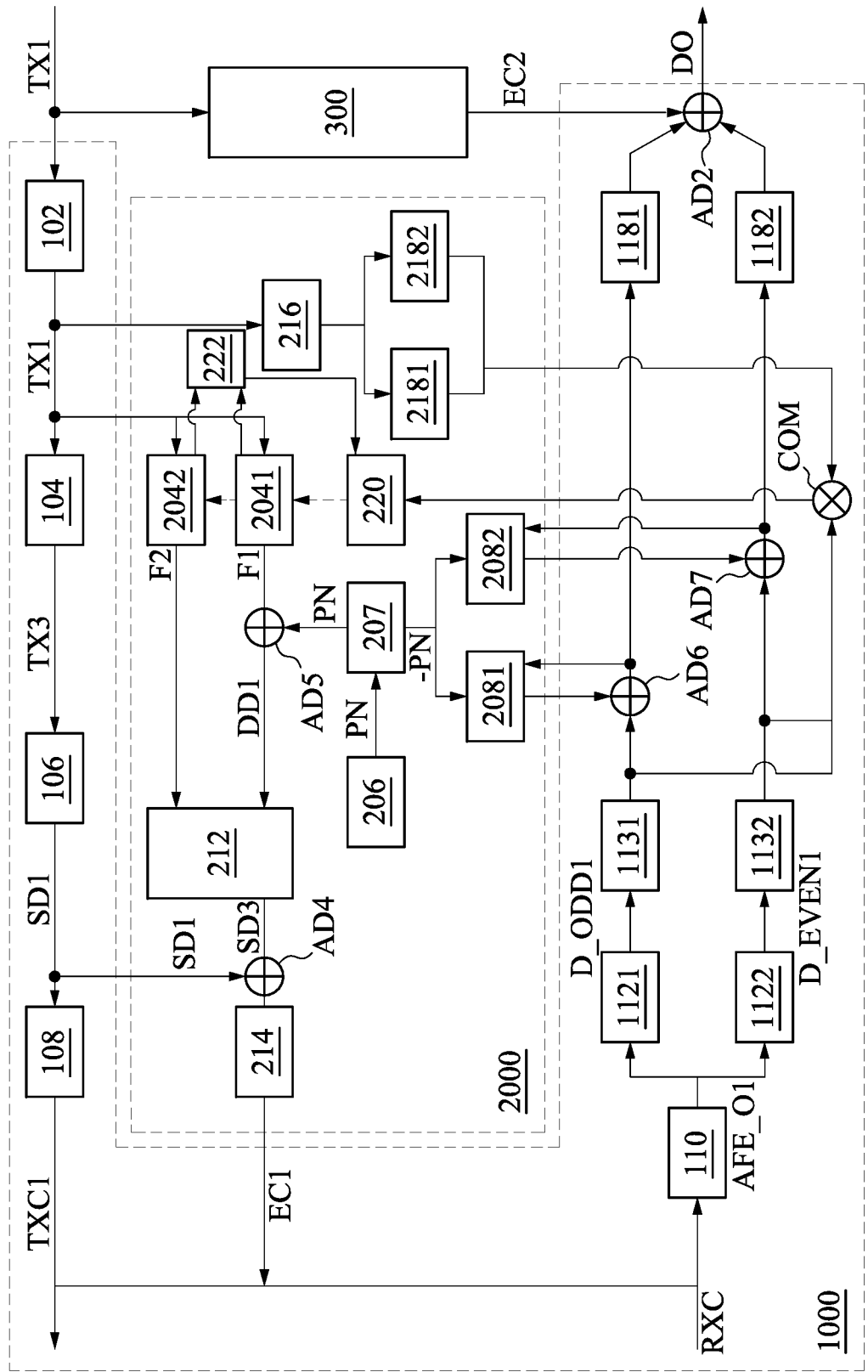
FIG. 2 is a schematic diagram illustrating an echo canceller system according to some embodiments of the present disclosure.

Reference is made to FIG. 2. FIG. 2 is a schematic diagram illustrating an echo cancelling system S2 according to some embodiments of the present disclosure. The echo cancelling system S2 in FIG. 2 is a poly-phase system.

To be more specific, a first major difference between the echo cancelling system S2 in FIG. 2 and the echo cancelling system S1 in FIG. 1 is that the data transmitter circuit 1000 of the echo cancelling system S2 further includes a memory 1131 and a memory 1132. A second one of major differences between the echo cancelling system S2 in FIG. 2 and the echo cancelling system S1 in FIG. 1 is that the echo canceller circuit 2000 of the echo cancelling system S2 further includes a filter 2041 (may be included in the filter circuit 204 in FIG. 1), a filter 2042 (may be included in the filter circuit 204 in FIG. 1), a memory 207, a filter 2081 (may be included in the filter circuit 208 in FIG. 1), a filter 2082 (may be included in the filter circuit 208 in FIG. 1), a memory 216, a filter 2181, and a filter 2182. In some embodiments, the memory 1131, the memory 1132, the memory 207, and the memory 216 can be implemented by registers which can perform the FIFO process, but the present disclosure is not limited thereto.

The filter 2041 and the filter 2042 receive the transmitted signal TX1, and the filter 2041 performs a filtering process on the transmitted signal TX1 according to the first phase (e.g., the odd phase) to output a filtered signal F1. The filter 2042 performs a filtering process on the transmitted signal TX1 according to the second phase (e.g., the even phase) to output a filtered signal F2. The details about how the FxLMS mechanism of the filter 2041 (or 2042) is updated according to a high-frequency leakage process to generate the filtered signal F1 (or F2) are described in following paragraphs.

The random sequence generator circuit 206 generates the random sequence PN. The adder AD5 combines the filtered signal F1 and the random sequence PN to generate a digital signal DD1. The shaping circuit 212 generates a shaping signal SD3 according to the digital signal DD1 and the filtered signal F2. The adder AD4 combines the shaping signal SD3 and the shaping signal SD1. The digital-to-analog converter 214 generates the echo cancelling signal EC1 based on a combination of the shaping signal SD3 and the shaping signal SD1. The analog front-end processor circuit 110 generates a processing signal AFE_O1 according to the analog signal TXC1 corresponding to the transmitted signal TX1, the echo cancelling signal EC1 and the received signal RXC. The analog-to-digital converter circuit 1121 samples the processing signal AFE_O1 with the first phase (e.g., the odd phase) to generate a digital signal D_ODD1. The analog-to-digital converter circuit 1122 samples the processing signal AFE_O1 with the second phase (e.g., the even phase) to generate a digital signal D_EVEN1.

In addition, the memory 207 outputs the inverted random sequence-PN to the filter 2081 and the filter 2082. The filter 2081 is coupled to the memory 1131 through an adder AD6. The filter 2082 is coupled to the memory 1132 through an adder AD7. The filter 2081, the memory 1131, and the analog-to-digital converter 1121 correspond to the first phase (e.g., the odd phase). The filter 2082, the memory 1132, and the analog-to-digital converter 1122 correspond to the second phase (e.g., the even phase). In some embodiments, the filter 2081 can be updated according to an output of the adder AD6 and the filter 2082 can be updated according to an output of the adder AD7.

In addition, the memory 216 transmits the transmitted signal TX1 to the filter 2181 and the filter 2182. A combination circuit COM updates, via an updating circuit 220, the FxLMS mechanism of the filter 2041 and the filter 2042 according to an output of the memory 1131, an output of the memory 1132, an output of the filter 2181 and an output of the filter 2182.

As described above, the echo cancelling system S2 in FIG. 2 adopts the poly-phase system. In other words, the echo cancelling system S2 processes signals with different phases separately. Thus, all or most of elements can be operated under a lower frequency to save power. In addition, since the echo cancelling system S2 adopts the poly-phase system, the circuit design can be more flexible. For example, it is easier to remove paths corresponding to one (e.g., the odd phase or the even phase) of the phases based on the design.

The details about how the FxLMS mechanism of the filter circuit 204 the filter 2041 (or 2042) is updated according to a high-frequency leakage process to generate the filtered signal F1 (or F2) are described in following paragraphs with reference to the echo cancelling system S2 in FIG. 2. The filter 2041 is taken as an example and the filter 2042 has similar operations, so the filter 2042 is not described herein again.

The filter 2041 generates the filtered signal F1 according to the transmitted signal TX1 and filter coefficients of the filter 2041. The filter coefficients of the filter 2041 can be a coefficient vector including multiple taps, and this coefficient vector can correspond to a waveform which has a specific shape. The filter 2041 can perform a convolution calculation on the transmitted signal TX1 and the filter coefficients of the filter 2041 to generate the filtered signal F1. In some embodiments, the coefficient vector of the filter 2041 includes 24 taps. It indicates that the coefficient vector of the filter 2041 has a single row and this row has 24 coefficients. However, the present disclosure is not limited to this tap number, and other suitable tap numbers are within the contemplated scopes of the present disclosure. When the tap number is less, the system can save more power.

As described above, the filter coefficients of the filter 2041 are updated according the high-frequency leakage process. In some embodiments, a calculation circuit 222 coupled to the filter 2041 can acquire a coefficient accumulation vector by formula (1) below:

$$\text{Grad}_{ACC} = \text{Grad}_{ACC} - M \times ER \times TX1 \quad (1)$$

in which $\text{Grad}_{ACC}$ is the coefficient accumulation vector and an initial value of each tap is 0, M is an intensity value and can be set according to the system design (e.g., when the accumulation speed or the updating speed is larger, M can be larger), ER indicates an error value at an output terminal of the memory 1131 (e.g., echoes which are not cancelled) (e.g., the calculation circuit 222 can be coupled to the memory 1131 to receive the error), and the transmitted signal TX1 is a data vector.

According formula (1) above, the coefficient accumulation vector $\text{Grad}_{ACC}$ continues to accumulate until one of the taps in the coefficient accumulation vector $\text{Grad}_{ACC}$ exceeds one least significant bit (LSB). Then, one LSB vector (e.g., LSBupdate in later formula (3)) is subtracted from the coefficient accumulation vector $\text{Grad}_{ACC}$ and then the coefficient accumulation vector $\text{Grad}_{ACC}$ continues to accumulate. A LSB vector (LSBupdate) can be stored temporarily in the updating circuit 220 couple to the calculation circuit 222. The updating circuit 220 can be implemented by a buffer.

However, when high-frequency components exist in the system, a high-frequency vector of the filter coefficients can be $\{+1,-1,+1 \ldots -1\}$. The calculation circuit 222 can acquire a high-frequency component parameter by formula (2) below:

$$OmE = \Sigma(\text{AECodd}) - (\text{AECeven}) \quad (2)$$

in which AECodd represents each of odd taps of the filter coefficients, AECeven represents each of even taps of the filter coefficients, OmE is the high-frequency component parameter and indicates whether the high-frequency components exist in the system. Based on formula (2) above, the high-frequency component parameter OmE is equal to a sum of the odd taps minus a sum of the even taps. When the high-frequency component parameter OmE is greater, it indicates that more high-frequency components exist in the system.

The calculation circuit 222 can receive the filter coefficients of the filter 2041, and the updating circuit 220 and the calculation circuit 222 can work together to update the filter coefficients of the filter 2041 according to a current filter coefficient vector, the LSB vector (stored temporarily in the updating circuit 220), and a high-frequency leakage vector, as formula (3) below:

$$AEC=AEC+\text{LSBupdate}+H\_LEAK \quad (3)$$

in which AEC on the left hand side of the equal sign is updated filter coefficients of the filter 2041, AEC on the right hand side of the equal sign is the current filter coefficient vector of the filter 2041, LSBupdate is the aforementioned LSB vector which is subtracted from the coefficient accumulation vector $\text{Grad}_{ACC}$, and H_LEAK is the high-frequency leakage vector.

The calculation circuit 222 can acquire the high-frequency leakage vector H_LEAK by formula (4) below:

$$H\_LEAK=EN \times AEC\_LSB \times AEC' \times \text{sign}\{OmE\} \times C \quad (4)$$

in which EN is an enable value, AEC_LSB is the LSB, AEC' is a leakage vector of the filter 2041 and can be an inversion of the aforementioned high-frequency vector (e.g., the high-frequency vector is multiplied by −1 to obtain {−1,+1,−1 . . . +1}), sign{OmE} indicates the sign of the high-frequency component parameter OmE, and C is a condition value. When the high-frequency component parameter OmE is not 0, it indicates that there are high-frequency components exist in the system. Thus, the enable value EN is set "1" to enable the high-frequency leakage vector H_LEAK. On the contrary, when the high-frequency component parameter OmE is 0, it indicates that there is no high-frequency component in the system. Thus, the enable value EN is set "0" to disable the high-frequency leakage vector H_LEAK. In some embodiments, the enable value EN is set by other units (e.g., a control unit of the echo cancelling system S2 or a control unit of the transceiver) coupled to the filter 2041 so as to control whether the filter coefficients of the filter 2041 is updated according to the high-frequency leakage vector H_LEAK.

In addition, when a condition (abs{OmE}≥|nTAP×AEC_LSB|) is met, the condition value C is set to "1", in which abs{OmE} is an absolute value of the high-frequency component parameter OmE, and nTAP is a total number of the taps. In this situation, when the absolute value of the high-frequency component parameter OmE is greater than or equal to an absolute value of a product of the tap number nTAP and AEC_LSB (the condition value C is set to "1"), the high-frequency leakage vector H_LEAK in formula (4) is equal to a product of the enable value EN, the LSB AEC_LSB, the leakage vector AEC', and the sign of the high-frequency component parameter OmE. The high-frequency leakage vector H_LEAK can be configured to cancel the high-frequency components in the filter coefficients AEC of the filter 2041 to remove the high-frequency components in the system and avoid the drift of the filter coefficients.

On the contrary, when the aforementioned condition (abs{OmE}≥|nTAP× AEC_LSB|) is not met, the condition value C is set "0". In this situation, when the absolute value of the high-frequency component parameter OmE is less than the absolute value of the product of the tap number nTAP of the filter coefficients and AEC_LSB (the condition value C is set "0"), the high-frequency leakage vector H_LEAK in formula (4) is 0.

In some embodiments, the high-frequency leakage vector H_LEAK can be updated according to an updating period. The updating period corresponds to a plurality of candidate values, and one of the candidate values can be chosen as the updating period. When a period length of the updating period is shorter, it can accelerate the leakage of the high-frequency components (the updating speed of the high-frequency leakage process is faster).

In addition, in some embodiments, the aforementioned process is used to update at least one of the taps. For example, the first updating is used to update one tap of the filter coefficients, and the second updating is used to update another tap of the filter coefficients, and so on. In some embodiments, the taps can be updated in parallel (simultaneously).

In addition, in some embodiments, the calculation circuit 222 and the updating circuit 220 can be integrated into a single circuit.

Based on the descriptions above, when high-frequency offsets exist in the system (the high-frequency component parameter OmE is not 0), the filter coefficients of the filter 2041 are updated according to the high-frequency leakage process (e.g., formula (3) above). Then, the filter 2041 performs the convolution calculation on the updated filter coefficients and the transmitted signal TX1 to generate the filtered signal F1. Then, an updated echo cancelling signal EC1 can be generated. With similar operations, the high-frequency components in the filter coefficients can be continuously removed to prevent the filter coefficients from drifting such that the system can operate correctly and the SNR of the echo cancelling system S2 can be kept at a higher value.

Figure 3:
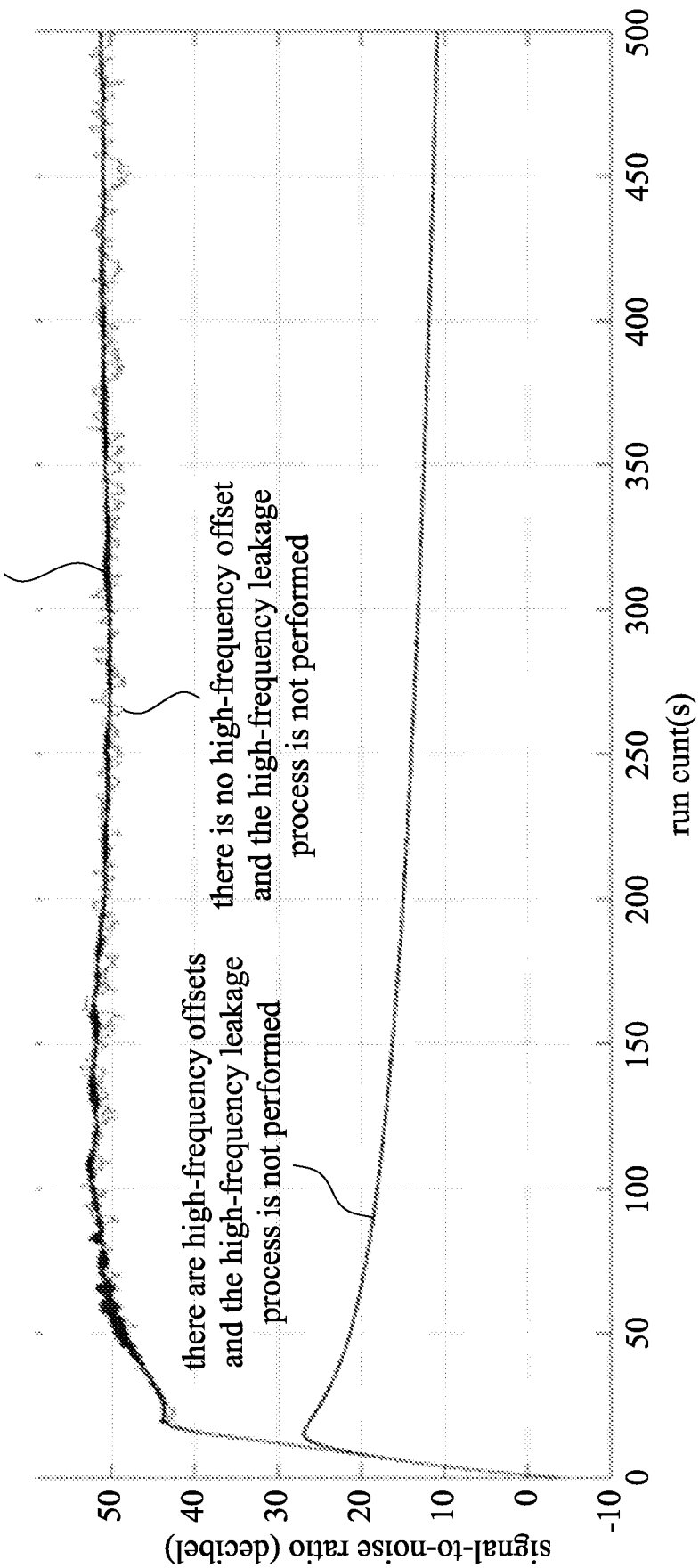
FIG. 3 is a schematic diagram illustrating a relationship of a run count value and SNR of a system.

Reference is made to FIG. 3. FIG. 3 is a schematic diagram illustrating a relationship of a run count value and SNR of a system. As illustrated in FIG. 3, when there is no high-frequency offset (e.g., the high-frequency component parameter OmE is 0) and the high-frequency leakage process is not performed, the SNR of the system is higher. However, when there are high-frequency offsets (the high-frequency component parameter OmE is not 0) and the high-frequency leakage process is not performed, the SNR of the system decreases as the number of run counts increases. When there are high-frequency offsets (the high-frequency component parameter OmE is not 0) and the high-frequency leakage process is performed, the SNR of the system can be kept at a higher value.

Figure 4:
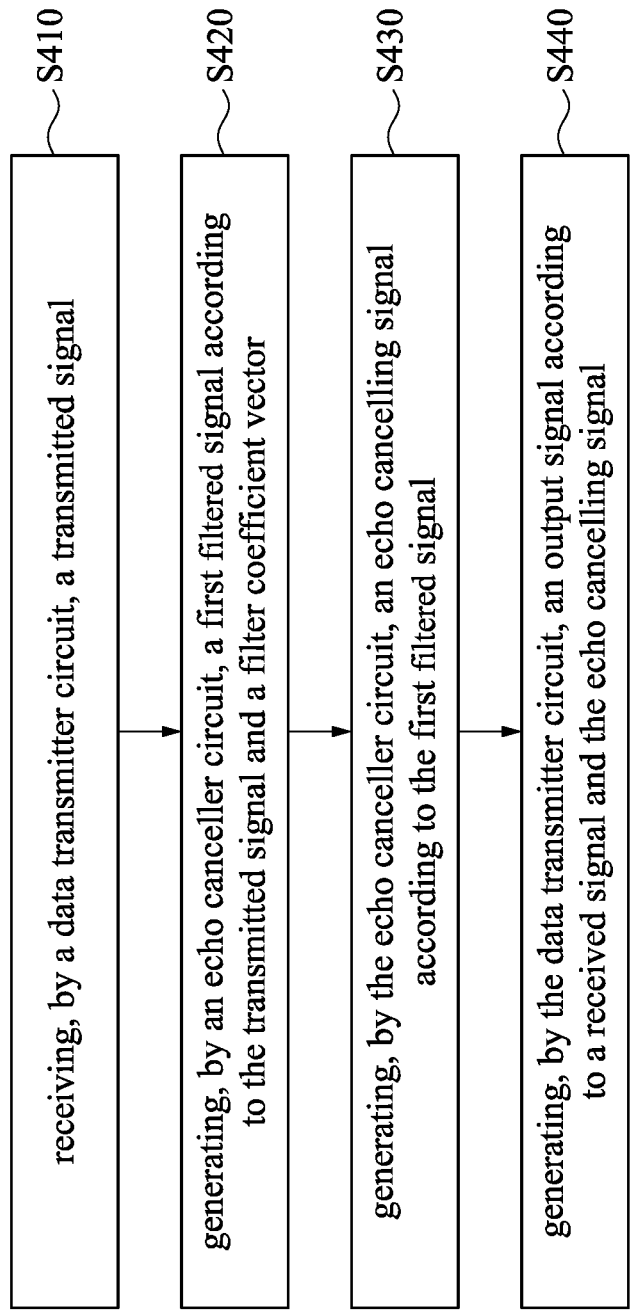
FIG. 4 is a flow diagram illustrating an echo cancelling method according to some embodiments of the present disclosure.

Reference is made to FIG. 4. FIG. 4 is a flow diagram illustrating an echo cancelling method 400 according to some embodiments of the present disclosure. The echo cancelling method 400 includes operations S410, S420, S430, and S440. For better understanding, the echo cancelling method 400 is described with reference to the echo cancelling system S2 in FIG. 2.

In operation S410, the data transmitter circuit 100 receives the transmitted signal TX1. In operation S420, the filter 2041 of the echo canceller circuit 200 generates the filtered signal F1 according to the transmitted signal TX1 and the filter coefficient vector of the filter 2041. The filter coefficients in the filter coefficient vector of the filter 2041 are updated according to the aforementioned high-frequency leakage process (e.g., formula (3) above) to suppress high-frequency components. In operation S430, the echo canceller circuit 200 generates the echo cancelling signal EC1 according to the filtered signal F1. In operation S440, the data transmitter circuit 100 generates output signal DO according to the received signal RXC and the echo cancelling signal EC1.

As described above, in the present disclosure, the filter coefficients of the filter circuit can be updated according to the high-frequency leakage process. Accordingly, the high-frequency components can be suppressed to avoid signal drifting such that the echo cancelling system can operate correctly.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An echo canceller system, comprising:
   a data transmitter circuit configured to receive a transmitted signal; and
   an echo canceller circuit configured to generate an echo cancelling signal according to a first filtered signal and comprising:
   a first filter configured to generate the first filtered signal according to the transmitted signal and a filter coefficient vector; and
   a calculation circuit associated with an updating circuit to update the filter coefficient vector according to a current filter coefficient vector, a least significant bit (LSB) vector, and a high-frequency leakage vector,
   wherein the data transmitter circuit is further configured to generate an output signal according to a received signal and the echo cancelling signal.

2. The echo canceller system of claim 1, wherein the first filter performs a convolution calculation according to the transmitted signal and the filter coefficient vector to generate the first filtered signal.

3. The echo canceller system of claim 1, wherein the calculation circuit accumulates a coefficient accumulation vector according to an error value and a data vector corresponding to the transmitted signal, and subtracts the LSB vector from the coefficient accumulation vector when a tap of the coefficient accumulation vector is accumulated over a LSB.

4. The echo canceller system of claim 1, wherein the filter coefficient vector comprises a plurality of taps,
wherein the calculation circuit sets the high-frequency leakage vector to be equal to a product of a LSB, a leakage vector of the filter coefficient vector, and a sign of a high-frequency component parameter when an absolute value of the high-frequency component parameter is greater than or equal to an absolute value of a product of the LSB and a total number of the taps.

5. The echo canceller system of claim 4, wherein the calculation circuit sets the high-frequency component parameter to be equal to a difference of a sum of a plurality of odd taps and a sum of a plurality of even taps.

6. The echo canceller system of claim 4, wherein the calculation circuit sets the high-frequency leakage vector to be zero when the absolute value of the high-frequency component parameter is less than the absolute value of the product of the LSB and the total number of the taps.

7. The echo canceller system of claim 1, wherein the calculation circuit associates with the updating circuit to update the high-frequency leakage vector is according to an updating period, the updating period corresponds to a plurality of candidate values and a decrease in a period length of the updating period corresponds to an increase in an updating speed.

8. The echo canceller system of claim 1, wherein the echo canceller circuit further comprises:
   a second filter configured to generate a second filtered signal according to the transmitted signal;
   an adder configured to generate a digital signal according to the first filtered signal and a random sequence;
   a shaping circuit configured to generate a first shaping signal according to the digital signal and the second filtered signal; and
   a digital-to-analog converter configured to generate the echo cancelling signal according to the first shaping signal and a second shaping signal corresponding to the transmitted signal.

9. An echo cancelling method, comprising:
   receiving, by a data transmitter circuit, a transmitted signal;
   generating, by a first filter of an echo canceller circuit, a first filtered signal according to the transmitted signal and a filter coefficient vector;
   updating, by a calculation circuit and an updating circuit of the echo canceller circuit, the filter coefficient vector according to a current filter coefficient vector, a least significant bit (LSB) vector, and a high-frequency leakage vector;
   generating, by the echo canceller circuit, an echo cancelling signal according to the first filtered signal; and
   generating, by the data transmitter circuit, an output signal according to a received signal and the echo cancelling signal.

10. The echo cancelling method of claim 9, further comprising:
    performing, by the first filter, a convolution calculation according to the transmitted signal and the filter coefficient vector to generate the first filtered signal.

11. The echo cancelling method of claim 9, further comprising:
    accumulating, by the calculation circuit, a coefficient accumulation vector according to an error value and a data vector corresponding to the transmitted signal; and
    subtracting, by the calculation circuit, the LSB vector from the coefficient accumulation vector when a tap of the coefficient accumulation vector is accumulated over a LSB.

12. The echo cancelling method of claim 9, wherein the filter coefficient vector comprises a plurality of taps and the echo cancelling method further comprises:
  setting, by the calculation circuit, the high-frequency leakage vector to be equal to a product of a LSB, a leakage vector of the filter coefficient vector, and a sign of a high-frequency component parameter when an absolute value of the high-frequency component parameter is greater than or equal to an absolute value of a product of the LSB and a total number of the taps.

13. The echo cancelling method of claim 12, further comprising:
  setting, by the calculation circuit, the high-frequency component parameter to be equal to a difference of a sum of a plurality of odd taps and a sum of a plurality of even taps.

14. The echo cancelling method of claim 12, further comprising:
  setting, by the calculation circuit, the high-frequency leakage vector to be zero when the absolute value of the high-frequency component parameter is less than the absolute value of the product of the LSB and the total number of the taps.

15. The echo cancelling method of claim 9, further comprising:
  updating, by the calculation circuit and the updating circuit, the high-frequency leakage vector according to an updating period corresponding to a plurality of candidate values, wherein a decrease in a length of the updating period corresponds to an increase in an updating speed.

16. The echo cancelling method of claim 9, further comprising:
  generating, by a second filter of the echo canceller circuit, a second filtered signal according to the transmitted signal;
  generating, by an adder of the echo canceller circuit, a digital signal according to the first filtered signal and a random sequence;
  generating, by a shaping circuit of the echo canceller circuit, a first shaping signal according to a digital signal and the second filtered signal; and
  generating, by a digital-to-analog converter of the echo canceller circuit, the echo cancelling signal according to the first shaping signal and a second shaping signal corresponding to the transmitted signal.

* * * * *